No. 692,349. Patented Feb. 4, 1902.
J. B. REICHENBACH.
SAW MANDREL.
(Application filed Nov. 11, 1901.)
(No Model.)
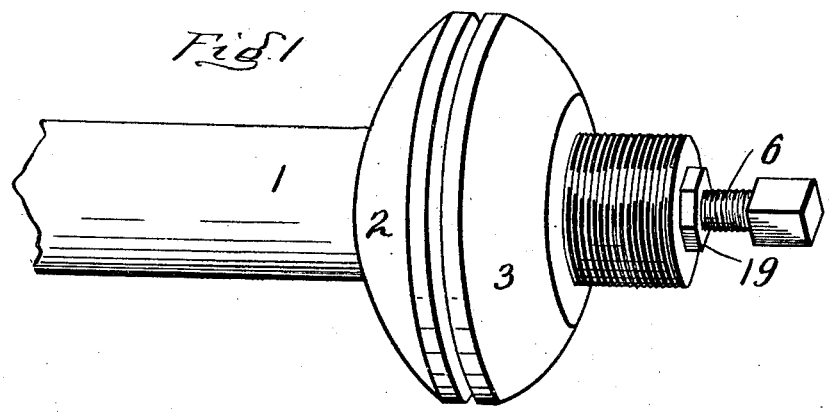
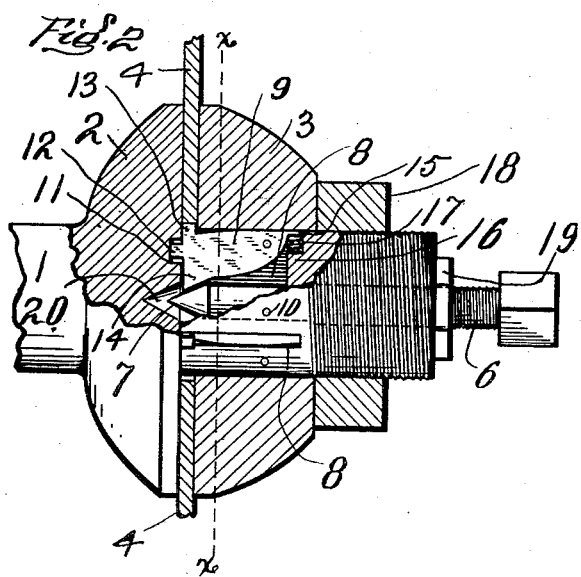
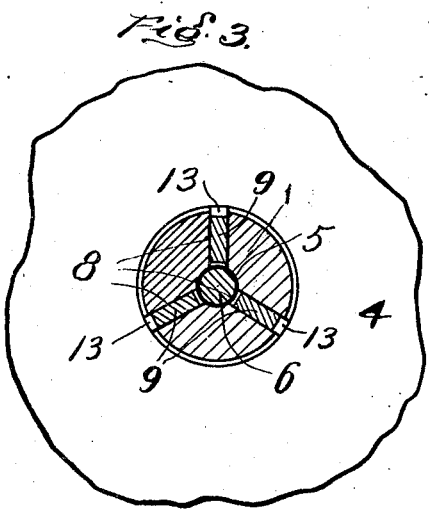
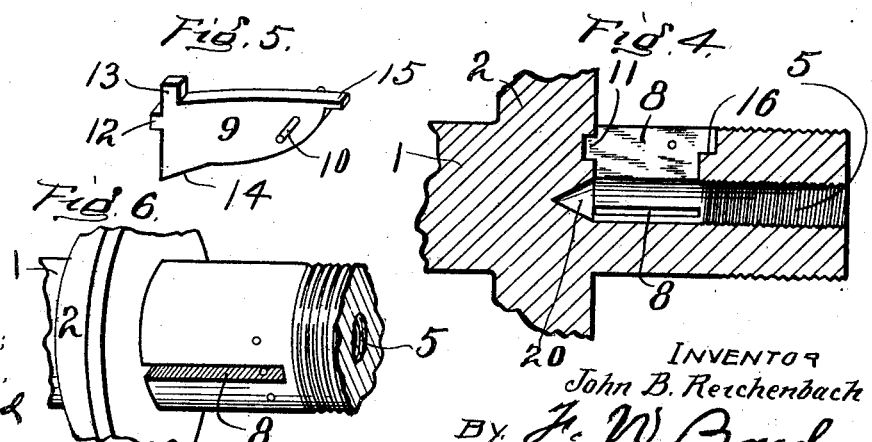
Witnesses:
C. J. Cross,
J. R. Bond
Inventor
John B. Reichenbach
By H. W. Bond
Atty.
THE NORRIS PETERS CO., PHOTO-LITHO., WASHINGTON, D.C.

UNITED STATES PATENT OFFICE.

JOHN B. REICHENBACH, OF WILMOT, OHIO.

SAW-MANDREL.

SPECIFICATION forming part of Letters Patent No. 692,349, dated February 4, 1902.

Application filed November 11, 1901. Serial No. 81,783. (No model.)

*To all whom it may concern:*

Be it known that I, JOHN B. REICHENBACH, a citizen of the United States, residing at Wilmot, in the county of Stark and State of Ohio, have invented certain new and useful Improvements in Saw-Mandrels; and I do hereby declare that the following is a full, clear, and exact description of the same, reference being had to the annexed drawings, making a part of this specification, and to the figures of reference marked thereon, in which—

Figure 1 is a view showing a portion of the mandrel and illustrating the fixed and loose collars located thereon. Fig. 2 is a sectional view of the saw, also showing the collars in section and illustrating a portion of the mandrel broken away. Fig. 3 is a transverse section of the mandrel and the pointed bolt, also showing transverse sections of the saw-retaining blades. Fig. 4 is a longitudinal section of the mandrel, showing the saw-retaining blades removed and also the pointed bolt removed. Fig. 5 is a detached view of one of the saw-retaining blades. Fig. 6 is a view showing a portion of the mandrel and illustrating one of the saw-retaining-blade slots or recesses.

The present invention has relation to saw-mandrels; and it consists in the novel construction hereinafter described, and particularly pointed out in the claims.

Similar numerals of reference indicate corresponding parts in all the figures of the drawings.

In the accompanying drawings, 1 represents the mandrel, which is provided with the usual fixed collar 2 and of course is provided with the loose or detachable collar or flange 3, said collars or flanges being located upon the opposite sides or faces of the saw 4. The end of the mandrel 1 to which the saw 4 is to be attached is provided with a screw-threaded aperture 5, which screw-threaded aperture is for the purpose of receiving and holding the pointed bolt or needle 6, which pointed bolt or needle is provided with the pointed or tapered end 7 and is for the purpose hereinafter described.

The mandrel 1 is provided with the slots or recesses 8. In the drawings three of these slots or recesses are illustrated; but it will be understood that the number may be increased without departing from the nature of the present invention. Within the slots or recesses are located the saw-retaining blades 9, which saw-retaining blades are pivoted to the mandrel by means of suitable cross-pins 10, said cross-pins being fixed in the mandrel 1.

The mandrel 1 is provided with the recesses or notches 11, which recesses or notches are located at the inner ends of the slots 8 and are for the purpose of receiving the end lugs 12, formed upon the saw-retaining blades 9, and for the purpose of assisting in holding the saw-retaining blades, said lugs being formed of a thickness to correspond substantially with the width of the notches 11, but should be so formed that the saw-retaining blades 9 are free to turn upon the cross-pins 10, as hereinafter described.

The saw-retaining blades 9 are provided upon their outer edges with the lugs 13, which lugs are for the purpose of engaging the eye of the saw 4, as illustrated in Fig. 2. The inner edges of the saw-retaining blades 9 are provided with the inclined shoulders 14, which inclined shoulders are so located that they will come in contact with the pointed end 7 of the bolt or needle 6. The blades 9 are provided with the extensions or arms 15, which extensions or arms are located directly over the shoulders 16, located at the outer ends of the slots or recesses 8, and between the bottom or under side of the arms 15 and the shoulders 16 are located the springs 17, which springs are for the purpose of automatically forcing the inner ends of the saw-retaining blades toward the center of the mandrel 1 when the tapered point 7 of the bolt or needle 6 is withdrawn from the contact with the inclined shoulders 14.

It will be understood that when the bolt or needle 6 is turned so as to move the same toward the saw 4 the blades 9 will be forced outward and engage the eye of the saw, by which arrangement the saw is properly centered upon the mandrel and at the same time securely held in proper position with reference to the mandrel, and after the collar 3 has been properly seated against the face of the saw said saw will be held in true position upon the mandrel.

It will be understood that the ordinary collar-holding nut 18 is to be employed to properly hold the collar or flange 3, and for the purpose of preventing any displacement of the bolt or needle 6 a jam-nut, such as 19, is located upon the screw-threaded portion of the needle 6 and is properly seated against the end of the mandrel 1 after the needle 6 has been brought into proper adjustment to bind the saw.

For the purpose of providing room for the longitudinal movement of the needle 6 a tapered recess 20 is formed in the mandrel and directly opposite the place where the tapered end 7 is located.

For the purpose of allowing the saw-retaining blades 9 to be moved outward without coming in contact with the eye of the collar 3 said blades are rounded upon their outer edges, as illustrated in the drawings, this arrangement being necessary to allow for the adjustment of the saw-retaining blades 9.

It will be understood that the saw-retaining blades 9, regardless of their number, should be equally spaced from each other, so that the strain will be the same in all directions.

Having fully described my invention, what I claim as new, and desire to secure by Letters Patent, is—

1. The combination of a mandrel provided with a fixed collar or flange, slots or recesses formed in the mandrel, recesses or notches located in the mandrel and adjacent to the slots, shoulders located at the outer ends of the slots in the mandrel, blades pivotally attached to the mandrel and located in the slots and provided with lugs upon their inner ends and outer edges, and flanges upon their inner edges having inclined shoulders, and a bolt or needle provided with a tapered end located in the mandrel and the tapered end of the needle interposed between the inner inclined shoulders of the blades, and the blades provided with extensions or arms, and springs located between the extensions or arms of the blades, and the shoulders of the notches located at the outer ends of the slots, substantially as and for the purpose specified.

2. The combination of a mandrel having fixed thereto a saw-collar, a movable saw collar or flange located upon the mandrel, means for holding the movable collar in fixed position, pivoted blades located in slots and provided with inclined shoulders upon their inner edges and lugs upon their outer edges, extensions or arms formed upon the pivoted blades, and springs interposed between the extensions of the blades and the shoulders of the notches located at the ends of the slots or recesses, and a screw-threaded bolt or needle provided with a tapered end, and a jam-nut located upon the screw-threaded bolt or needle, substantially as and for the purpose specified.

3. The combination of a mandrel provided with recesses or slots, pivoted blades located in the recesses or slots and the blades provided with lugs located upon the inner ends and outer edges of the blades, and inclined shoulders or flanges upon their inner edges, a screw-threaded bolt or needle provided with a tapered end and the tapered end located adjacent to the inclined shoulders of the pivoted blades, and the pivoted blades provided with extensions or arms at their outer ends, and springs located under the extensions or arms and the outer edges of the pivoted blades rounded, substantially as and for the purpose specified.

In testimony that I claim the above I have hereunto subscribed my name in the presence of two witnesses.

JOHN B. REICHENBACH.

Witnesses:
 J. A. JEFFERS,
 F. W. BOND.